3,496,527
Patented Feb. 17, 1970

1

3,496,527
TRANSDUCER FOR DETERMINING THE ANGLE OF INCIDENCE OF SOUND WAVES
Günter Hans Ziehm, Kiel, Karl-Friedrich Triebold, Bremen, and Siegfried Franz Heinrich Drischel, Duisburg, Germany, assignors to Fried. Krupp Gesellschaft mit beschrankter Haftung, Essen, Germany
Filed Nov. 21, 1968, Ser. No. 777,806
Claims priority, application Germany, Nov. 21, 1967, 1,566,858
Int. Cl. H04r 15/00
U.S. Cl. 340—11      4 Claims

ABSTRACT OF THE DISCLOSURE

A transducer for converting sound vibrations into electrical signals for determining the angle of incidence of sound waves. The transducer is constructed in the shape of a hollow cylinder. It has four means, spaced at 90° intervals around the hollow cylinder, each of which produces an electrical signal that is dependent on mechanical vibrations of a portion of the hollow cylinder and being connected two by two in reversed series, each pair of which is sensitive to oscillations in only a limited angular region around the hollow cylinder, and throughout this angular region, the sensitivity of each pair is varied. The difference signals, formed from the signals produced by each two oppositely arranged means connected two by two, are thus made independent of the harmonics which are a function of the angle of incidence of the waves.

CROSS REFERENCE TO RELATED APPLICATION

The subject matter of this application is related to that disclosed in co-pending application Ser. No. 701,772, filed Jan. 30, 1968, of Günter Ziehm, Karl-Friedrich Triebold, Alfred Schief and Reinhard Wilhelm Leisterer.

BACKGROUND OF THE INVENTION

The present invention relates to directional sensitive sound receiving transducers, such as sonar transducers used for detecting sound waves in water. More particularly, the present invention relates to sound receiving transducers which are small or, at most, comparable in size with the wave lengths received and which include four receiving assemblies spaced at 90° intervals about a central axis.

After the development, in the radio art, of direction-finding crossed coil antennas of the type which are small compared to the wave lengths of the radio waves to be received, acoustic receiving arrangements were also constructed, particularly in the sonar art, which operate with two perpendicularly crossed receiver systems of identical sensitivity. Such receivers produce two electrical voltages at a pair of outputs having amplitudes in the ratio, one to the other, of cosine $\gamma$/sine $\gamma$, where $\gamma$ is the angle of incidence of sound waves with respect to one of the two systems.

It is common practice, in the case of such sound receiving transducers to arrange two identically sensitive receivers in each of the two crossed directions spaced apart a distance equal to or less than the wave lengths to be received and connected together so that the directional sensitivity exhibited by their output voltages will have the characteristic of a figure 8. It is also usual to apply the pair of output voltages, with corresponding amplification, if necessary, to the crossed deflection systems of a cathode ray tube so as to display a line on the screen of the tube which is likewise inclined at the angle $\gamma$ with respect to the preferred deflection axis of the tube. This deflection line will extend outward in both directions from the center of the screen.

If it is desired to have the deflection line extend outward from the center of the screen in one direction only, to make the display easier to read, it is common practice to provide an additional receiving transducer in the center of the two crossed receiver systems. This transducer produces a "center voltage" which, though shifted in phase by $-90°$ with respect to the difference voltages, can be phase-matched to the difference voltages by shifting its phase by $+90°$. After passing the phase-matched voltage through a clipping amplifier which converts it to a series of pulses, the signal is applied to a Wehnelt control electrode of the cathode ray tube to interrupt the electron beam during the signal period in which the signal beam, if uninterrupted, would form the portion of the deflection line which extends outward from the center of the screen in the direction opposite to the direction corresponding to the direction of incidence of the sound waves.

It is also possible to darken the appropriate side of the deflection line without the use of an additional centrally located receiving transducer by connecting together the outputs of the external receiving transducers in the following manner: The two pairs of transducers arranged diametrically opposite each other are each connected in a non-interacting manner to a difference network or difference amplifier, while all four transducers are connected in a non-interacting manner to a summing network or summing amplifier. The two difference signals, so produced, are then supplied to the cathode ray tube to provide the deflection in the two orthogonal axes while the summed signal is connected, as described above, to elminate that half of the deflection line which extends from the center of the screen in a direction opposite to that representing the direction of incidence of the sound waves.

The prior art receiver arrangements described above have the disadvantage, however, that they require the use of either four or five individual receiving transducers.

SUMMARY OF THE INVENTION

An object of the present invention, therefore, is to provide a single sound receiving transducer which is capable of producing the various voltages of the prior art receiver arrangements described above.

This object, as well as other objects which will become apparent in the discussion that follows, is achieved, according to the present invention, by providing a sound receiving transducer in the form of a hollow cylinder and providing four means, spaced at 90° intervals around the hollow cylinder, that produce an electrical signal in dependence upon mechanical vibrations of a portion of the hollow cylinder. Said means are connected two by two in reversed series and each pair is sensitive to oscillations in only a limited angular region around the hollow cylinder, and throughout this angular region the sensitivity is varied.

The resulting transducer is then connected in the manner of the prior art receiver arrangements which employ four or five seperate transducers. The two pairs of oppositely arranged means are connected to form difference signals from their respective electrical signals. By properly varying the sensitivity of the signals producing means, in a manner to be described in detail below, the difference signals are made independent of the harmonics which are a function of the angle of incidence of the sound waves.

The present invention is applicable to all the common magnetostrictive hollow cylinder receiving transducers known in the art, be they made of laminations of nickel, nickel alloys, alloys of other metals or of a magnetostrictive ferrite body. These prior art transducers having omni-directional sensitivity are provided with noninterrupted windings like those known in their art e.g. at toroidal cores of current transformers with windings wound around the wall of the core. In contrary it is part of this invention that the hollow cylinder of these magnetostrictive transducers now is provided with four windings which act as the four signal producing means. These windings are spaced around equal segments of the hollow cylinders at 90° intervals with a winding density which varies along each segment. If desired, the hollow cylinder can also be provided with a fifth winding, extending all the way around, to provide the signal corresponding to the signal produced by the centrally located receiving transducer in the five element receiver arrangement of the prior art.

The present invention is also applicable in an analogous manner to electrostrictive hollow cylinder receiving transducers made, for example, of lead, zirconium titanate or barium titanate. However, instead of using windings, as in the case of magnetostrictive transducers, the prevailing sound pressure field is obtained from the electrostrictive transducer in the form of an electrical voltage with individual metallic electrodes. These individual electrodes are electrically connected into four groups, each group displaced by 90° from the adjacent groups, and each covering a segment of the hollow cylinder. According to the invention, the electrodes of each group are arranged unevenly around the segment covered by the group.

The present invention can, in fact, be applied to any type of hollow cylinder sound receiving transducer which employs means to convert mechanical vibrations in separate segments of the cylinder into electrical signals. These means can be realized, for example, by capacitor plates in an electrostatic transducer, or by strain gauges arranged around the hollow cylinder and connected in groups in the manner of the electrostrictive transducer described above.

According to the invention, the means are combined two by two for producing the electrical signals with each pair having a varying sensitivity around the segments of the hollow cylinder in which they are operative. These variations in sensitivity can be calculated with the object in view that the difference signals, formed from the signals produced by each two oppositely arranged means, become independent of the harmonics which are a function of the angle of incidence of the sound waves.

The sound waves propagating in the medium surrounding the hollow cylinder receiving transducer excites the hollow cylinder into forced oscillations which are comprised of a fundamental oscillation and a number of higher spatial harmonics. The voltage generated, for example, in the winding (magnetostrictive) or between two adjacent electrodes (electrostrictive) at the point $v$ on the hollow cylinder by an incident sound wave of angular frequency $\omega$ (radians) is given by the expression $$U_v = A \cos \omega t \sum_{K=0}^{\infty} a_K \cos K(\gamma - \alpha_v)$$

where:

$A = g_E \cdot p$ $g_E$ = electroacoustical conversion constant (voltage sensitivity) of the sound receiving transducer in volts per microbar $p$ = amplitude of the alternating pressure of the incident sound wave in microbars $K = 0, 1, 2, \ldots$ = the characteristic factor of the particular $K$th harmonic $a_K$ = amplitude factor of the $K$th harmonic $\gamma$ = the angle between the radius of reference of the transducer and the direction of incidence of the sound waves $\alpha_v$ = angle between the radius of reference of the transducer and a radius extending to a point $v$ on the hollow cylinder (in the case of the magnetostrictive transducer, this point $v$ is the point of particular windings in question; in the case of the electrostrictive or electrostatic transducer this point $v$ is the point midway between two particular electrodes in question).

If two identical partial windings or electrode groups which are displaced by 180° and arranged symmetrically with respect to the radius of reference of the transducer are connected together to form a difference voltage $U_D$, the portion $U_{DK}$ thereof which is dependnet upon the $K$th harmonic at the angle of sound incidence $\gamma$ will equal zero for even values of $K$ and when $K$ is odd:

$$U_{DK} = A \cdot \cos \omega t \cdot 2 a_K \cdot \cos K\gamma \cdot \sum_{v=1}^{n} W_v \cos K\alpha_v$$

wherein $W_v$ equal the number of winds at point $v$ with a magnetostrictive hollow cylinder thansducer or $W_v = 1$ with an electrostrictive hollow cylinder transducer, and $n$ equals the number of points $v$ for a single signal producing means.

To shorten this expresion $$\sum_{v=1}^{n} W_v \cos K\alpha_v$$

is set equal to $b_K$. $b_K$ is the winding factor (magnetostrictive) or group factor (electrostrictive) for the $K$th harmonic at an angle of sound incidence $\gamma$. If the partial windings are always uniformly wound beyond the region $2\alpha_0$, the winding factor will be $b_K = \sin K\alpha_0$.

As a result of the present invention, the disturbing portions $U_{DK}$ of the difference voltages $U_D$, which are dependent upon the harmonics of the angle of sound incidence $\gamma$, may be eliminated or at least be reduced in magnitude since, by suitable choice of $W_v$ and $\alpha_v$ or $\alpha_0$, the summation in the expression for $U_{DK}$ can be made equal to 0 or at least be made small compared to the summation at $K=1$.

DESCRIPTION OF THE PREFERRED EMBODIMENTS

Figure 1:
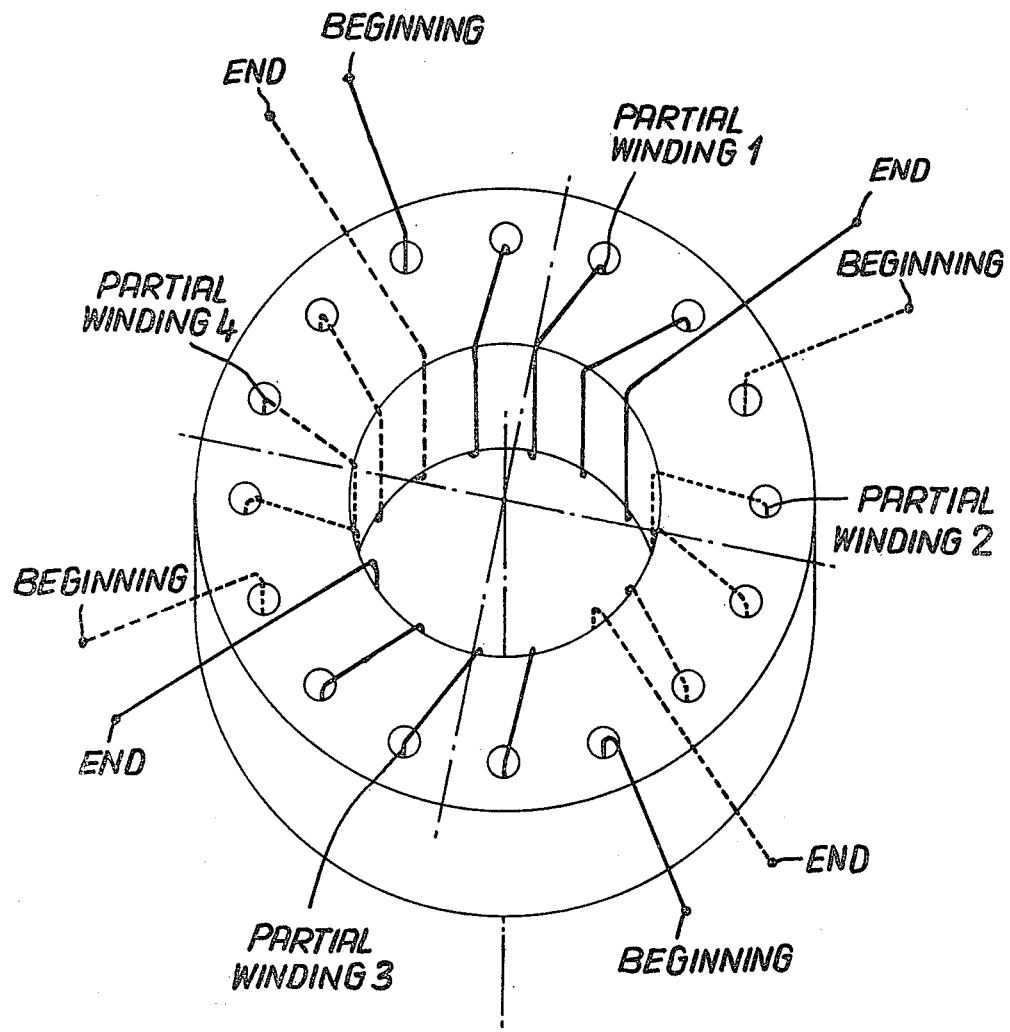
FIGURE 1 is a schematic diagram, in perspective, of a magnetostrictive hollow cylinder receiving transducer having four partial windings according to a preferred embodiment of the present invention.

Referring now to the drawings, FIGURE 1 shows a hollow cylinder receiving transducer made of layers of nickel alloy laminations and provided with four windings. As is shown, the winding wire can be wound around a portion of the hollow cylinder between winding holes and the internal radius thereof. It can also be wound between the winding holes and the external radius or wound around the entire wall of the hollow cylinder formed by the sheets of laminations. The transducer can be premagnetized by connecting all of the windings in series or in parallel and passing direct current to the circuit to circularly magnetize the hollow cylinder. Since a single application of current is sufficient to establish a permanent field in the cylinder, it will be unnecessary to maintain a continuous excitation current during operation.

Figure 2:
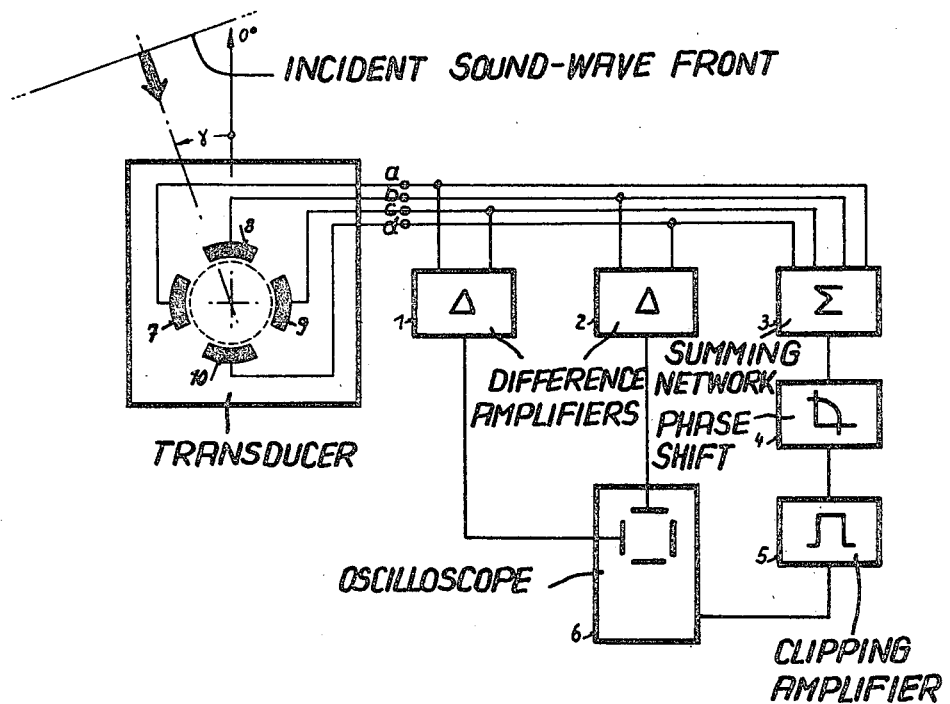
FIGURE 2 is a schematic diagram of sonar receiving and display apparatus suitable for use with the receiving transducer of FIGURE 1 as well as with four individual transducers of the prior art.

FIGURE 2 schematically illustrates apparatus which may be used with the hollow cylinder receiving transducers according to the present invention to display the direction of propagation of incident sound waves. The four separate sections 7, 8, 9 and 10 of the transducer (which, for example, may be constituted by the four partial windings of a magnetostrictive transducer) produce signal voltages of equal magnitude for equal amplitudes of acoustic vibrations. The difference between the voltages produced by diametrically oppositely oriented sections of the transducer is obtained by the difference networks or difference amplifiers 1 and 2. The voltages produced by all the sections of the transducer are added in the summing network or summing amplifier 3. Neither the difference elements 1 and 2 nor the summing element 3 permits the voltage produced by one of the sections of the transducer to react or cause a change in the voltage produced by any of the others.

The phase of the sum voltage produced by the summing element 3 is displaced by a factor of $-\pi/2$ with respect to the phase of the two difference voltages. This is corrected by a phase shifting element 4 so that the sum voltage and the difference voltages will have the same phase. It should be noted that if the sum voltage were shifted in phase with respect to the difference voltages by $+\pi/2$ this phase match could be accomplished by inserting phase shifting elements in the difference voltage channels. Likewise, if the signs of the phase in the sum voltage and in the difference voltage channels were opposite, the phase matching could be accomplished by means of appropriate phase shifting elements in all the channels.

The difference voltages, the amplitudes of which are proportional to the cosine and sine, respectively, of the angle of incidence $\gamma$ of the sound waves, are applied to the X and Y axis deflection systems of the cathode ray tube 6. The sum voltage is passed through a clipping amplifier 5 and applied to the Wehnelt control electrode of the cathode ray tube to inhibit the electron beam when it is directed along that portion of the line on the screen at the angle $\gamma+180°$. As a result, the line displayed on the screen of the tube will extend outward from the center of the screen in one direction only at an angle $\gamma$ from the reference axis of the tube.

Figure 3:
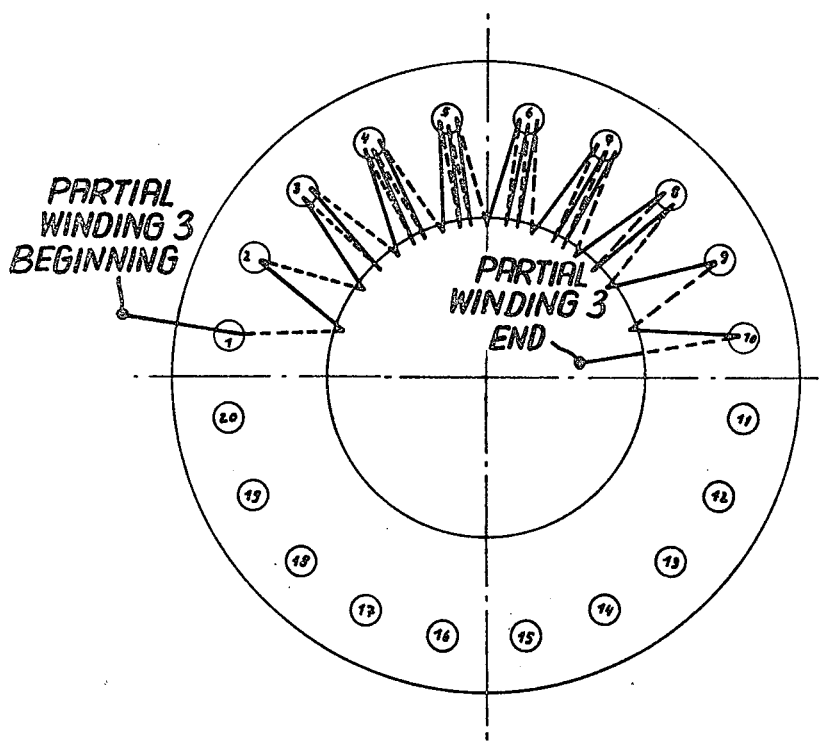
FIGURE 3 is a schematic diagram, in top view, of a portion of a specific magnetostrictive hollow cylinder receiving transducer according to FIGURE 1.

FIGURE 3 schematically shows a directional sensitive, magnetostrictive hollow cylinder transducer according to a particular preferred embodiment of the present invention. This transducer is provided with 20 winding holes arranged symmetrically about the axis of the hollow cylinder and four partial windings, displaced by 90° around the cylinder, each extending around the angular segment of the cylinder defined by 10 holes. For the sake of clarity, only one of the partial windings is shown in FIGURE 3.

The winding density of each partial winding is varied in the same way around the angular segment in which it is located. The position of each winding as well as these variations in winding density are given for each winding in the table below.

TABLE

| Winding Hole | Number of Windings Through Each Winding Hole — Partial Windings | | | | Beginning Partial Winding | End Partial Winding |
|---|---|---|---|---|---|---|
|  | 1 | 2 | 3 | 4 | | |
| 1 | 3 |   | 1 |   | 3 |   |
| 2 | 3 |   | 1 |   |   |   |
| 3 | 2 |   | 2 |   |   |   |
| 4 | 1 |   | 3 |   |   |   |
| 5 | 1 |   | 3 |   |   | 1 |
| 6 |   | 1 | 3 |   | 2 |   |
| 7 |   | 1 | 3 |   |   |   |
| 8 |   | 2 | 2 |   |   |   |
| 9 |   | 3 | 1 |   |   |   |
| 10 |   | 3 | 1 |   |   | 3 |
| 11 |   | 3 |   | 1 | 4 |   |
| 12 |   | 3 |   | 1 |   |   |
| 13 |   | 2 |   | 2 |   |   |
| 14 |   | 1 |   | 3 |   |   |
| 15 |   | 1 |   | 3 |   | 2 |
| 16 | 1 |   |   | 3 | 1 |   |
| 17 | 1 |   |   | 3 |   |   |
| 18 | 2 |   |   | 2 |   |   |
| 19 | 3 |   |   | 1 |   |   |
| 20 | 3 |   |   | 1 |   | 4 |

The pairs of diametrically opposite partial windings of the magnetostrictive transducer of FIGURE 3 are connected to a different network or amplifier to produce difference voltages which, upon receipt of incident sound waves, are completely independent of the spatial harmonics $5\gamma$ and in which the harmonics $3\gamma$ and $7\gamma$ are substantially eliminated. As noted above:

$$U_{DK} = A \cos(\omega t) \cdot 2a_K \cdot b_K \cos K\gamma$$

where $$b_K = \sum_{v=1}^{n} W_v \cos K\alpha_v$$

Therefore, the winding factors will be:

$$b_1 = 7.6607$$
$$b_3 = 0.2863$$
$$b_5 = 0.0$$
$$b_7 = 0.9215$$

Figure 4:
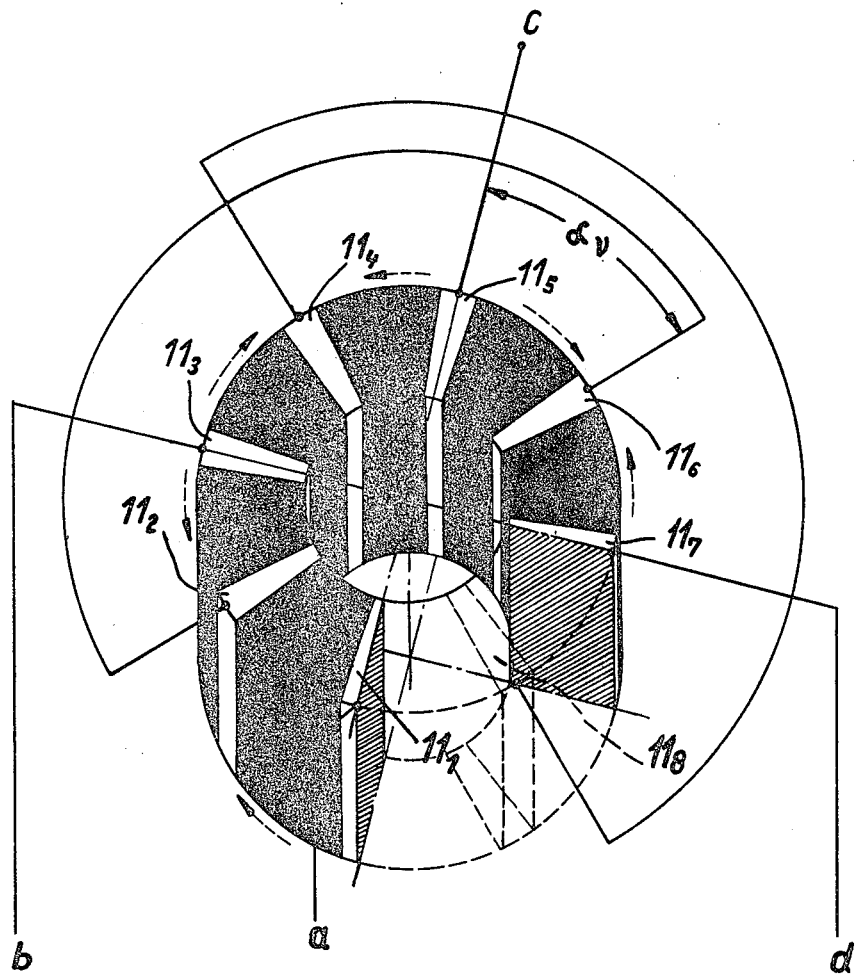
FIGURE 4 is a cut-away schematic diagram, in perspective, of an electrostrictive hollow cylinder receiving transducer according to the present invention, having eight metal plates.

FIGURE 4 shows a partially cut away view of a directional sensitive sound receiving transducer having a hollow cylindrical body made of electrostrictive material. This body is provided with eight metal plates $11_1$–$11_8$ which serve as electrodes. Each of these metal plates surrounds the wall of the hollow cylinder in its particular angular region. As in the case of the windings of the magnetostrictive transducer of FIGURE 1, these electrodes may be used to impress a permanent circular polarization to the hollow cylindrical body.

Figure 5:
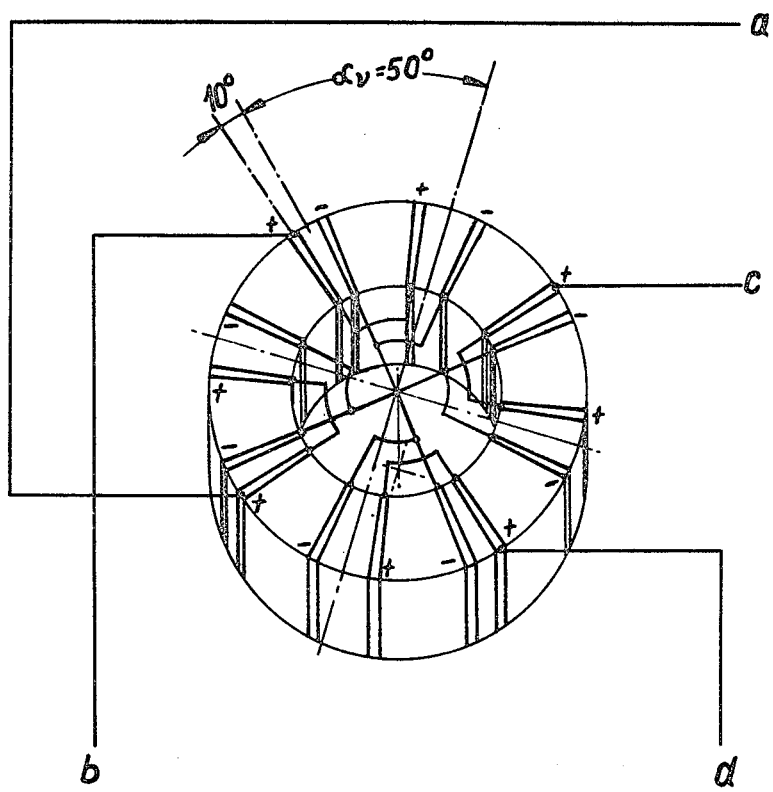
FIGURE 5 is a schematic diagram, in top view, of an electrostrictive hollow cylinder receiving transducer according to another preferred embodiment of the present invention having embedded electrodes.

FIGURE 5 illustrates another embodiment of the electrostrictive or electrostatic hollow cylinder transducer according to the present invention. This transducer is provided with electrodes extending parallel to the axis of the hollow cylinder to produce the circular polarization. These electrodes extend, in the axial direction, the full height of the cylinder; in the radial direction they extend the full thickness of the wall.

The number of electrodes, the angle $\alpha_v$ from the reference radius of the cylinder to the radius passing through the center of the utilized space between the electrodes, and the circuit for connecting the individual electrodes into four identical electrode groups, each displaced by 90° around the hollow cylinder, are chosen, so that according to:

$$b_K = \sum_{v=1}^{n} \cos K\alpha_v$$

the group factors will be $b_1=3.26$; $b_3=0$; $b_5=0.6$; $b_7=-129$; and $b_9=0$.

For reasons of clarity, the circuit connection between the electrodes is shown in FIGURE 5. The angles $\alpha_v$ to the centers of the intermediate spaces between the electrodes of an electrode group are 10° and 50°, respectively.

Figure 6:
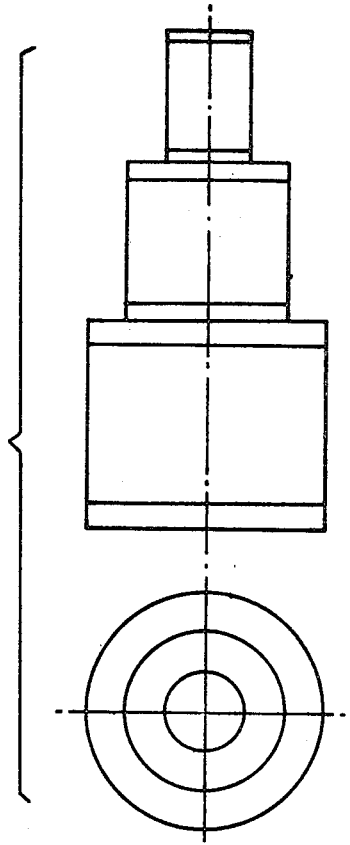
FIGURE 6 is a schematic diagram, in elevation and in top view, of a receiving column consisting of three hollow cylinder receiving transducers of different diameters.

It will be understood that the above description of the present invention is susceptible to various modifications, changes and adaptations, and is not limited to the particular examples shown and described. In particular, if it is necessary to cover a broad range of frequencies, it is possible to employ a plurality of receiving transducers of differing diameters arranged together, as shown in FIGURE 6. It may be necessary to employ individual preamplifiers with each transducer since the larger transducers will clearly exhibit a higher sensitivity. For higher frequencies, however, the large transducer will no longer be small in size compared with the wave length of the sound.

The present invention is applicable, in fact, to every type of microphone effect transducer where mechanical movements or stresses are converted to electrical currents or voltages. By an analogous distribution of the signal producing means in connection with hollow cylinders, the present invention can also be applied to numerous other devices; for example, devices employing strain or expansion measuring strips (strain gauges), or the like.

Figure 7:
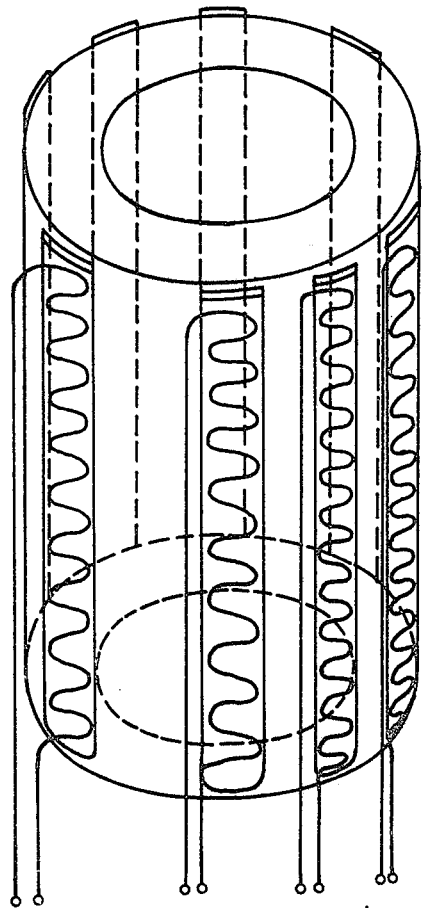
FIGURE 7 is a schematic diagram, in perspective and in top view, of a hollow cylinder receiving transducer according to still another embodiment of the invention having eight strain gauges.
Figure 7:
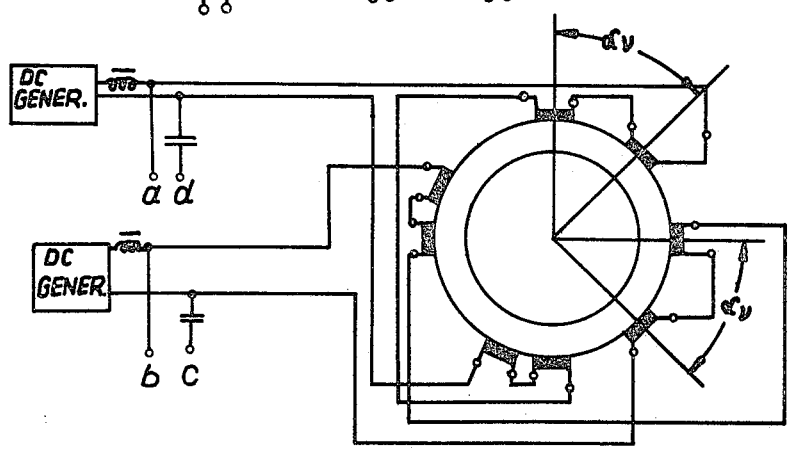

In FIGURE 7 is shown a receiving transducer using these strain gauges fixed to the outside of the wall of a hollow cylinder in a configuration described above when dealing with the metallic electrodes in FIGURE 4. Out of the current sent through the four groups the information is diverted via capacitive coupling.

What is claimed is:

1. A sound receiving transducer constructed in the form of a hollow cylinder for determining the direction of propagation of incident sound waves, said transducer having four windings, spaced at 90° intervals around the hollow cylinder, for producing an electrical signal in dependence upon mechanical oscillations of the hollow cylinder, each of said four windings being receptive to oscillations in a definite angular region around said hollow cylinder, said windings being connected two by two in reversed series and each winding having different winding densities at different points around its region to measure the oscillations in its respective angular region with differing sensitivity at different points around said region.

2. The improvement defined in claim 1, wherein the number of turns of said windings $W_v$, at the $n$ angles $\alpha_v$ between a reference point on the circumference of the hollow cylinder and the points $\gamma$ on the circumference where the turns are wound, are chosen so that the winding factors $$b_K = \sum_{v=1}^{n} W_v \cos K\alpha_v$$

for all $K$ other than $K=1$ will be at least substantially less than the winding factor for $K=1$ where K is an integer.

3. The improvement defined in claim 1, wherein said windings have a uniform winding density over an angular region of $2\alpha_0$, the angle $\alpha_0$ being chosen so that the value $\sin K\alpha_0$ for all K greater than $K=1$ will be at least substantially less than the value $\sin \alpha_0$, where K is an integer.

4. The improvement defined in claim 1, comprising a plurality of said sound receiving transducers of different diameter joined together on a common axis to form a single unit.

References Cited

UNITED STATES PATENTS

| | | | |
|---|---|---|---|
| 2,724,818 | 11/1955 | Camp | 340—9 |
| 3,043,967 | 7/1962 | Clearwaters. | |
| 3,136,381 | 6/1964 | Anderson | 340—10 X |
| 3,142,035 | 7/1964 | Harris | 340—10 |
| 3,264,604 | 8/1966 | Bartlett | 340—8 |
| 3,290,646 | 12/1966 | Ehrlich et al. | 340—6 X |
| 3,325,780 | 6/1967 | Horan | 340—10 |

OTHER REFERENCES

Wilson, IEEE Trans Sonics & Ultrasonics, March 1966, pp. 16–19.

RICHARD A. FARLEY, Primary Examiner

U.S. Cl. X.R.

340—6, 8